(12) United States Patent
Kajaria (10) Patent No.: US 11,466,536 B2
(45) Date of Patent: Oct. 11, 2022

(54) HYDRAULIC OVERRIDE FOR CONFINED SPACE

(71) Applicant: Vault Pressure Control, LLC, Houston, TX (US)

(72) Inventor: Saurabh Kajaria, Houston, TX (US)

(73) Assignee: Vault Pressure Control, LLC, Houston, TX (US)

( * ) Notice: Subject to any disclaimer, the term of this patent is extended or adjusted under 35 U.S.C. 154(b) by 0 days.

(21) Appl. No.: 17/060,221

(22) Filed: Oct. 1, 2020

(65) Prior Publication Data

US 2021/0102439 A1   Apr. 8, 2021

Related U.S. Application Data

(60) Provisional application No. 62/910,927, filed on Oct. 4, 2019.

(51) Int. Cl.
*E21B 34/02* (2006.01)
*F16K 31/05* (2006.01)

(52) U.S. Cl.
CPC .............. *E21B 34/02* (2013.01); *F16K 31/05* (2013.01)

(58) Field of Classification Search
CPC ........ E21B 34/02; E21B 34/025; E21B 34/16; F16K 31/05
See application file for complete search history.

(56) References Cited

U.S. PATENT DOCUMENTS

| 3,552,903 A | 1/1971 | Townsend |
| 3,643,736 A | 2/1972 | Talley, Jr. |
| 3,777,812 A | 12/1973 | Burkhardt |
| 4,633,952 A * | 1/1987 | Ringgenberg .......... E21B 43/25 166/336 |
| 4,809,733 A * | 3/1989 | Hawkins ................ E21B 34/02 137/236.1 |
| 4,848,474 A | 7/1989 | Parizot |

(Continued)

FOREIGN PATENT DOCUMENTS

| AU | 2013/403353 | 4/2015 |
| GB | 2233365 | 1/1991 |

(Continued)

OTHER PUBLICATIONS

International Search Report and Written Opinion dated Dec. 15, 2015 in related PCT Application No. PCT/US2015/033492.

(Continued)

*Primary Examiner* — Daniel P Stephenson
(74) *Attorney, Agent, or Firm* — Morgan, Lewis & Bockius LLP (57) ABSTRACT

A wellhead valve control system includes a removable actuator adapted to couple to a valve, the valve being operable via a first operational mode. The system also includes an actuator element associated with the removable actuator, the actuator element operable to modify the first operational mode of the valve to a second operational mode, the second operational mode being different from the first operational mode. The system further includes a control panel, positioned remotely from the valve, the control panel configured to control the actuator element to adjust a valve position in the second operational mode.

20 Claims, 5 Drawing Sheets

(56) References Cited

U.S. PATENT DOCUMENTS

| | | | |
|---|---|---|---|
| 5,299,641 A * | 4/1994 | Paulo | E21B 33/0355 166/341 |
| 8,220,553 B2 | 7/2012 | Crawford | |
| 8,944,159 B2 | 2/2015 | Guidry | |
| 9,052,061 B2 | 6/2015 | He | |
| 9,222,555 B2 | 12/2015 | Morin | |
| 9,315,372 B2 | 4/2016 | Doi et al. | |
| 9,840,901 B2 | 12/2017 | Oehring | |
| 10,260,327 B2 | 4/2019 | Kajaria | |
| 2002/0124889 A1* | 9/2002 | Sundararajan | F16K 37/0008 137/559 |
| 2004/0134665 A1* | 7/2004 | Greeb | E21B 34/02 166/379 |
| 2006/0124300 A1 | 6/2006 | Steiner | |
| 2006/0219299 A1* | 10/2006 | Snowbarger | F16K 37/0091 137/487.5 |
| 2009/0050311 A1 | 2/2009 | Crawford | |
| 2009/0266554 A1 | 10/2009 | Wilson | |
| 2010/0032031 A1 | 2/2010 | Neal | |
| 2010/0051272 A1 | 3/2010 | Loree | |
| 2010/0154894 A1* | 6/2010 | Kotapish | F16K 17/10 137/14 |
| 2011/0030963 A1 | 2/2011 | Demong | |
| 2011/0240126 A1* | 10/2011 | Lymberopoulos | F16K 31/56 137/1 |
| 2012/0160499 A1 | 6/2012 | Tirio | |
| 2012/0181046 A1 | 7/2012 | Kajaria | |
| 2012/0227983 A1* | 9/2012 | Lymberopoulos | E21B 41/0021 166/373 |
| 2013/0233560 A1 | 9/2013 | Davidson | |
| 2014/0352968 A1 | 12/2014 | Pitcher | |
| 2015/0007995 A1 | 1/2015 | Livescu | |
| 2015/0114652 A1 | 4/2015 | Lestz | |
| 2015/0136409 A1 | 5/2015 | Hall | |
| 2015/0345272 A1 | 12/2015 | Kajaria | |
| 2016/0061016 A1 | 3/2016 | Ciezobka | |
| 2016/0102537 A1 | 4/2016 | Lopez | |
| 2016/0273346 A1 | 9/2016 | Tang | |
| 2016/0298439 A1 | 10/2016 | Morrow | |
| 2016/0329697 A1 | 11/2016 | Brooks | |
| 2017/0022788 A1 | 1/2017 | Oehring | |
| 2017/0146189 A1 | 5/2017 | Herman | |
| 2017/0234335 A1 | 8/2017 | LeBlanc | |
| 2018/0156004 A1 | 6/2018 | Hussain | |
| 2018/0258742 A1 | 9/2018 | Sveberg | |
| 2018/0371840 A1* | 12/2018 | Cummins | E21B 10/61 |
| 2019/0292891 A1 | 9/2019 | Kajaria | |
| 2020/0056468 A1* | 2/2020 | MacLeod | E21B 43/34 |
| 2020/0224510 A1* | 7/2020 | Zaragoza Labes | E21B 33/04 |
| 2021/0102439 A1* | 4/2021 | Kajaria | E21B 34/025 |

FOREIGN PATENT DOCUMENTS

| | | | |
|---|---|---|---|
| WO | 199003490 | 4/1990 | |
| WO | WO-2013062907 A1 * | 5/2013 | F15B 20/00 |
| WO | 2014197351 | 12/2014 | |
| WO | 2015030757 | 3/2015 | |
| WO | 2017/218457 | 12/2017 | |

OTHER PUBLICATIONS

International Search Report and Written Opinion dated Jan. 29, 2020 in related PCT Application No. PCT/US19/61124.

Patent Cooperation Treaty; International Preliminary Report on Patentability; PCT/US2020/053991; dated Oct. 2, 2020.

* cited by examiner

HYDRAULIC OVERRIDE FOR CONFINED SPACE

CROSS REFERENCE TO RELATED APPLICATIONS

This application claims priority to and the benefit of U.S. Provisional Application Ser. No. 62/910,927 filed Oct. 4, 2019 titled "HYDRAULIC OVERRIDE FOR CONFINED SPACE," the full disclosure of which is hereby incorporated herein by reference in its entirety for all purposes.

BACKGROUND

1. Field of Invention

This disclosure relates in general to oil and gas tools, and in particular, to systems and methods for operating valves in locations where access may be restricted.

2. Description of the Prior Art

In oil and gas production, wellheads may be arranged in cellars, which are considered confined spaces for health and safety purposes. The wellheads may include one or more valves that are manually operated, such as by a hand wheel. As a result, operators lower themselves into the cellar to make physical contact with the valve. This is undesirable because confined space entry is considered a potential health and safety risk, and as a result, significant safety checks and preparations are made prior to performing confined space entry. This is time consuming, but necessary to reduce the risk of entering the confined space.

SUMMARY

Applicant recognized the problems noted above herein and conceived and developed embodiments of systems and methods, according to the present disclosure, for operating valves in confined spaces.

In an embodiment, a wellhead valve control system includes a removable actuator adapted to couple to a valve, the valve being operable via a first operational mode. The wellhead valve control system also includes an actuator element associated with the removable actuator, the actuator element operable to modify the first operational mode of the valve to a second operational mode, the second operational mode being different from the first operational mode. The wellhead valve control system further includes a control panel, positioned remotely from and outside of a line of sight from the valve, the control panel configured to provide control instructions to the actuator element to control the valve via the actuator element in the second operational mode.

In an embodiment, a wellhead valve control system includes a removable actuator adapted to couple to a valve, the valve being operable via a first operational mode. The system also includes an actuator element associated with the removable actuator, the actuator element operable to modify the first operational mode of the valve to a second operational mode, the second operational mode being different from the first operational mode. The system further includes a control panel, positioned remotely from the valve, the control panel configured to control the actuator element to adjust a valve position in the second operational mode.

In an embodiment, a wellhead monitoring system includes a valve positioned along a flow path of the wellhead, the valve being a operable via a first operational mode that corresponds to a manual operating mode. The wellhead monitoring system also includes a removable actuator, coupled to the valve, the removable actuator enabling operating of the valve via a second operational mode, different from the first operational mode, the second operational mode being a remotely controlled operational mode. The wellhead monitoring system further includes a control unit, arranged at a location remote from the wellhead and outside of a confined space associated with the valve, the control unit sending a signal to one or more motive power sources to drive operational of the valve via the second operational mode.

In an embodiment, a method for controlling a valve includes receiving a removable actuator, the removable actuator changing an operational mode for a valve from a first operational mode to a second operational mode. The method also includes entering a confined space, the valve being positioned within the confined space. The method further includes coupling the removable actuator to the valve. The method includes operating the valve via the second operational mode from a remote location.

BRIEF DESCRIPTION OF THE DRAWINGS

The present technology will be better understood on reading the following detailed description of non-limiting embodiments thereof, and on examining the accompanying drawings, in which.

DETAILED DESCRIPTION OF THE INVENTION

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

Embodiments of the present disclosure are directed toward systems and methods for quick conversion between manual valves to valves that may be remote actuated, while still maintaining the ability to operate manually. In other words, systems and methods are directed toward valve conversion that provides dual modes of operation. Utilizing such systems and methods may reduce or eliminate confined space entries for wellhead valves positioned within a cellar (e.g., a confined space). This may be advantageous from a perspective of operator safety, as well as save time and money at the well site. In various embodiments, the system may be installed on current valves without redesigning or modify the current valves, allowing retrofitting and immediate deployment. The system may include a removable actuator that may be scaled based on operating conditions. As a result, safety at the well site may be improved while providing advantageous automation enablement.

In various embodiments, the removable actuator does not interfere with the manual operation of the valves. In other words, the original method of operation may provide for override of any remote or automatic control. This may be used as a backup provision in the event the manual operator fails. By way of example, a hand wheel may remain accessible, even after the removable actuator is attached. Additionally, the removable actuator may be bolted on, thereby enabling quick removal for manual operations. It should be appreciated that bolting is provided by way of example only and other forms of coupling the removable actuator to the valve may also be used. In other embodiments, manual operation may be enabled while the removable actuator remains attached to the valve. As a result, operators can utilize embodiments of the present disclosure in the manner that is suited for specific situations. In various embodiments, the removable actuator is operable via pneumatics, hydraulics, electronics, or a combination thereof. Accordingly, a typical well site will likely have equipment also utilizing one or more of the same mechanisms, thereby providing ease of use and operation because operators will already be familiar with the method of operation and a source will likely be available nearby. Furthermore, embodiments of the present disclosure may include a position indicator to relay a position of the valve (e.g., of a blocking element of a valve) to an operator, for example at a control panel. As a result, operators may be able to monitor the valve position from a safe distance, rather than being within a line of sight of the valve.

Figure 1:
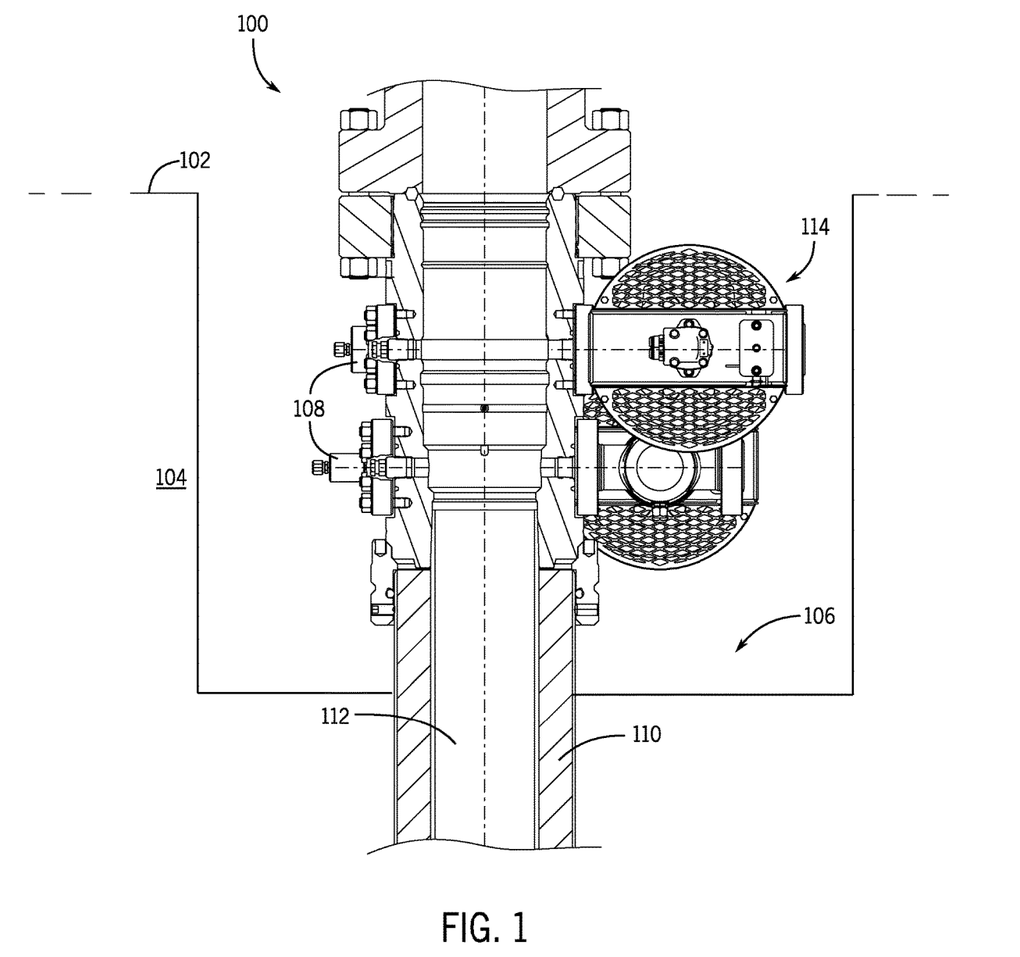
FIG. 1 is a cross-sectional view of an embodiment of a wellhead within a cellar, in accordance with embodiments of the present disclosure.

FIG. 1 is a side elevational view of an embodiment of a wellhead 100. In this example, various components have been omitted for clarity and conciseness. For example, various surface components, such as a tree, blowout preventer (BOP), and the like are omitted. In this example, the wellhead 100 extends below a surface location 102 into a formation 104. A cavity or cellar 106 is formed within the formation 104 and includes various components of the wellhead 100.

For example, the illustrated wellhead includes a pair of valves 108. These valves 108 may be manually operated or remotely operated valves. In this example, the valves 108 are manually operated and may be moved between an open position, a closed position, or intermediate positions using an operator, such as a hand wheel (not pictured). It should be appreciated that the arrangement of the valves 108 may provide for staggered operators and, in various embodiments, there may be more or fewer valves.

The illustrated wellhead 100 is coupled to a first casing 110 and includes a second casing 112 extending therethrough and coaxially aligned with the first casing 110. The first casing 110 may be positioned within the formation 104. As noted above, in various embodiments the wellhead may include a blowout preventer (BOP), not illustrated in FIG. 1, that may be arranged axially above the wellhead. The BOP may include various sealing elements to block flow into and/or out of the well.

As noted above, the area including the valves 108 may be referred to as the cellar 106 and may be deemed a confined space for operational purposes. As used herein, a confined space refers to a space with limited entry and egress, which may be occasionally entered or occupied, but is not deemed suitable human inhabitants. In other words, the confined space may be an area that is entered for a limited, specified purpose, such as a maintenance or production operation, but then is evacuated by the personnel. Furthermore, a confined space may also refer to an area with limited or restricted means for entry or exit that is not designed for continuous occupancy. Confined spaces may require special access considerations, such as safety checks and paperwork, prior to allowing operations personnel into the space. This presents a challenge at a well site, as it is desirable to maintain manual operation of the valves, while also undesirable to have operators in confined spaces. Access to confined spaces provides a necessary slow down to well site operations in order to evaluate access for health and safety concerns. It is desirable to limit confined space entries and, when necessary, to reduce a time for being within the confined space. Embodiments of the present disclosure are directed toward systems and methods for reduced confined space entry at the well site, which may improve health and safety procedures as well as provide operational advantages.

In this example, removable actuators 114 are coupled to the valves 108 to enable operation from a remote location, such as a location outside of the confined space of the cellar 106 and out of sight of the valves 108. In this example, each valve 108 has an independent actuator 114, which is illustrated as driven by hydraulic fluid in the embodiment of FIG. 1, but may also be a pneumatic or electric actuator. The removable actuator 114 is coupled to the valve bonnet via bolts and may be removed. Bolts are provided as a non-limiting example and other coupling methods may also be utilized. For example, a frame may be positioned around the valves to facilitate installation of the removable actuators 114. Removal of the actuators 114 is desirable because, in various embodiments, the wellhead 100 is buried after the well has reached its end of life. Because actuated valves may be expensive and utilize various pieces of support equipment, it is desirable to include manual valves, which are left in place, rather than the more expensive actuated valves. Accordingly, embodiments of the present disclosure provide the benefits of both circumstances, where the valves may be manually operable and selectively actuated.

Embodiments of the present disclosure include the removable actuators 114 (e.g., conversion assemblies) that may be utilized to convert manually operated valves into remotely operated valves. Additionally, in various embodiments, the removable actuators 114 may further be utilized to convert actuated valves into valves actuated by a different mechanism (e.g., convert a pneumatic actuator into a hydraulic actuator). In certain embodiments, the removable actuators 114 include a valve frame for coupling to the valves 108. For example, the valve frame may be coupled to a body of the valve 108, thereby securing the removable actuators 114 to the valve 108. Embodiments include an actuator element, which may be a remotely actuatable element, such as a hydraulic actuator, a pneumatic actuator, an electrical actuator, or the like. The actuator element may couple to a valve stem or a manual operator, which may then drive movement of the valve stem between an open position and a closed position. In this manner, the removable actuators 114 may be used in order to adjust operation of the valves 108.

In various embodiments, one or more flow lines are utilized to provide motive power to the illustrated removable actuators 114. For example, a flow line may enable hydraulic fluid to enter and exit a chamber of the removable actuators 114, thereby driving movement of the valve stem to adjust a position of the valve 108. It should be appreciated that flow lines are provided as an illustrative example and other systems and methods may be incorporated to provide motive power to the removable actuators 114.

Various embodiments may also include one or more sensors associated with the removable actuators 114 to facilitate operation of a monitoring system. The sensors may obtain valve position information to provide information to an operator that is controlling the removable actuators 114 from a remote location. Accordingly, the operator may know a valve position without being within a line of sight of the valve, which allows operators to be positioned outside of a pressure zone, for example during fracturing operations.

Figure 2:
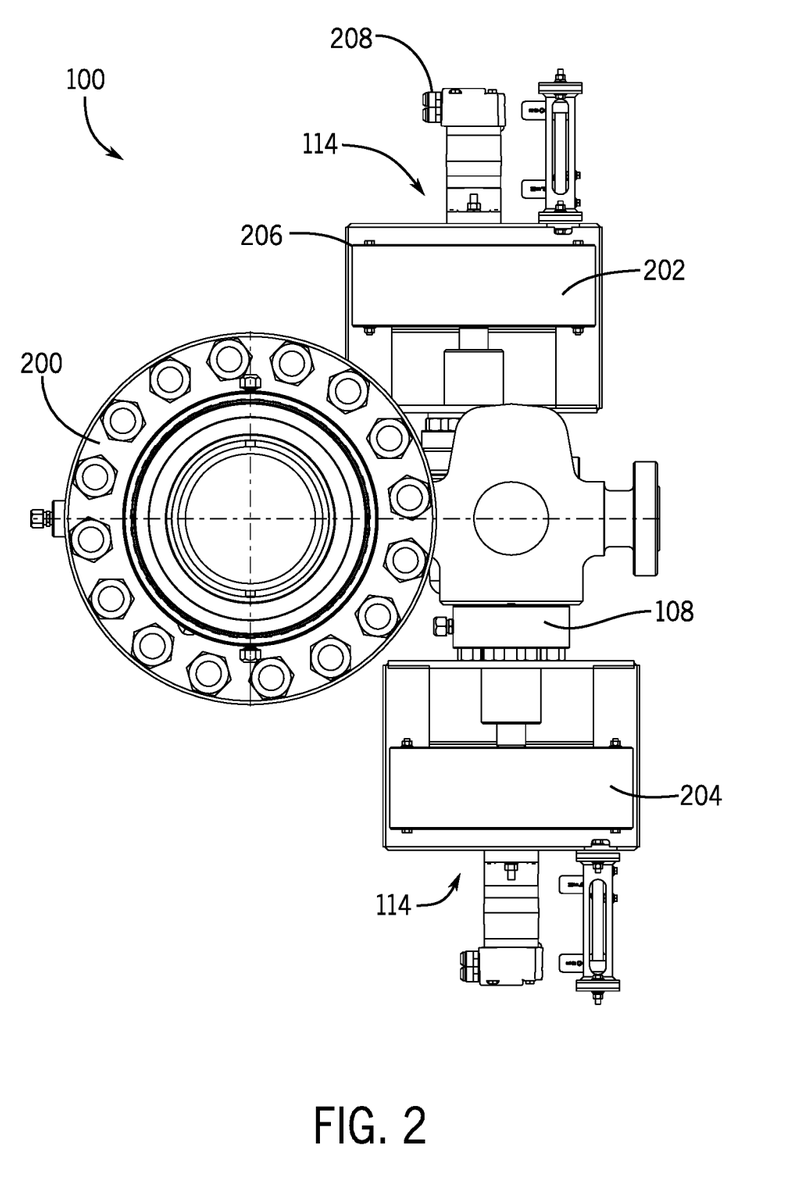
FIG. 2 is a top plan view of an embodiment of a wellhead, in accordance with embodiments of the present disclosure.

FIG. 2 is a top plan view of the wellhead 100 including a flange 200 that may be utilized to couple to various components, such as a BOP (not pictured). In this example, the valves 108 are axially stacked, but staggered, such that respective operators 202, 204 are both visible. In other words, the valves 108 are positioned such that the operators 202, 204 are circumferentially misaligned, which provides access to both of the valves 108 simultaneously without increasing an overall height of the configuration. The illustrated operators 202, 204 in FIG. 2 are hand wheels, but it should be appreciated that various embodiments may include different operators 202, 204. Additionally, for embodiments where the valves 108 are remote operated valves, the operators 202, 204 may be ports or lines that provide a motive force and the removable actuators 114 may couple directly to a valve stem to drive movement, among other options.

In this example, the removable actuators 114 are coupled to the respective operators 202, 204. The removable actuators 114 include frame components 206 that may be utilized to couple the actuators 114 to the valves 108 and then remove the actuators 114, and as a result, the actuators 114 may be utilized during an operation and then removed upon abandonment or after certain phases of wellbore operations are complete.

The illustrated removable actuators 114 are shown coupled directly to the operators 202, 204, but it should be appreciated that other embodiments may include removable actuators 114 that are coupled to other components of the valves 108, such as directly to the stem. Furthermore, the frame components 206 are also illustrative and the removable actuators 114 may be coupled directly to the valves 108, for example, to one or more brackets or clamped around a bonnet. The illustrated removable actuators 114 are driven by a hydraulic fluid that include ports 208 that may receive the fluid in order to drive movement of the operators 202, 204. For example, a fluid may enter the port 208 and cause a bar or coupling to rotate about an axis, thereby driving rotation of the operators 202, 204, which is translated to the valve stem to control operation of the valve. In certain embodiments, a control panel, arranged at a remote location out of direct sight of the valve 108, may be used to direct the flow of fluid into the ports 208, thereby driving movement between open and closed positions of the valves, as well as various intermediate positions without having an operator within the cellar 106.

In various embodiments, the removable actuator 114 further includes, or is communicatively coupled to, a position sensor (not pictured). The position sensor may relay a position of the valve (e.g., open, closed, ½ open, etc.) to the control panel, thereby providing improved operational information for the operator, which as indicated above, may not be in a position to visually inspect the valve position. Various different position sensors may be utilized, such as optical sensors, magnetic sensors, electric sensors, and the like. For example, a magnetic sensor may be arranged on the valve stem and a vertical position of the valve stem may be indicative of the valve position (e.g., for a rising stem valve). Additionally, optical sensors may be utilized to evaluate valve positions. Furthermore, in various embodiments, the sensors may count a number of turns of the hand wheel that correspond to an open position or a closed position for the valve. As a result, an operator may be positioned at a remote control panel, which may be out of a line of sight of the valve, and operate the valve and receive information indicative of the valve position. Accordingly, operation of the valve is enabled without confined space entry and the functionality of the actuator may be removed, for example, to take the well out of service. Moreover, the valve maintains functionality in a manual operation mode, which may be desirable in a variety of circumstances.

Figure 3:
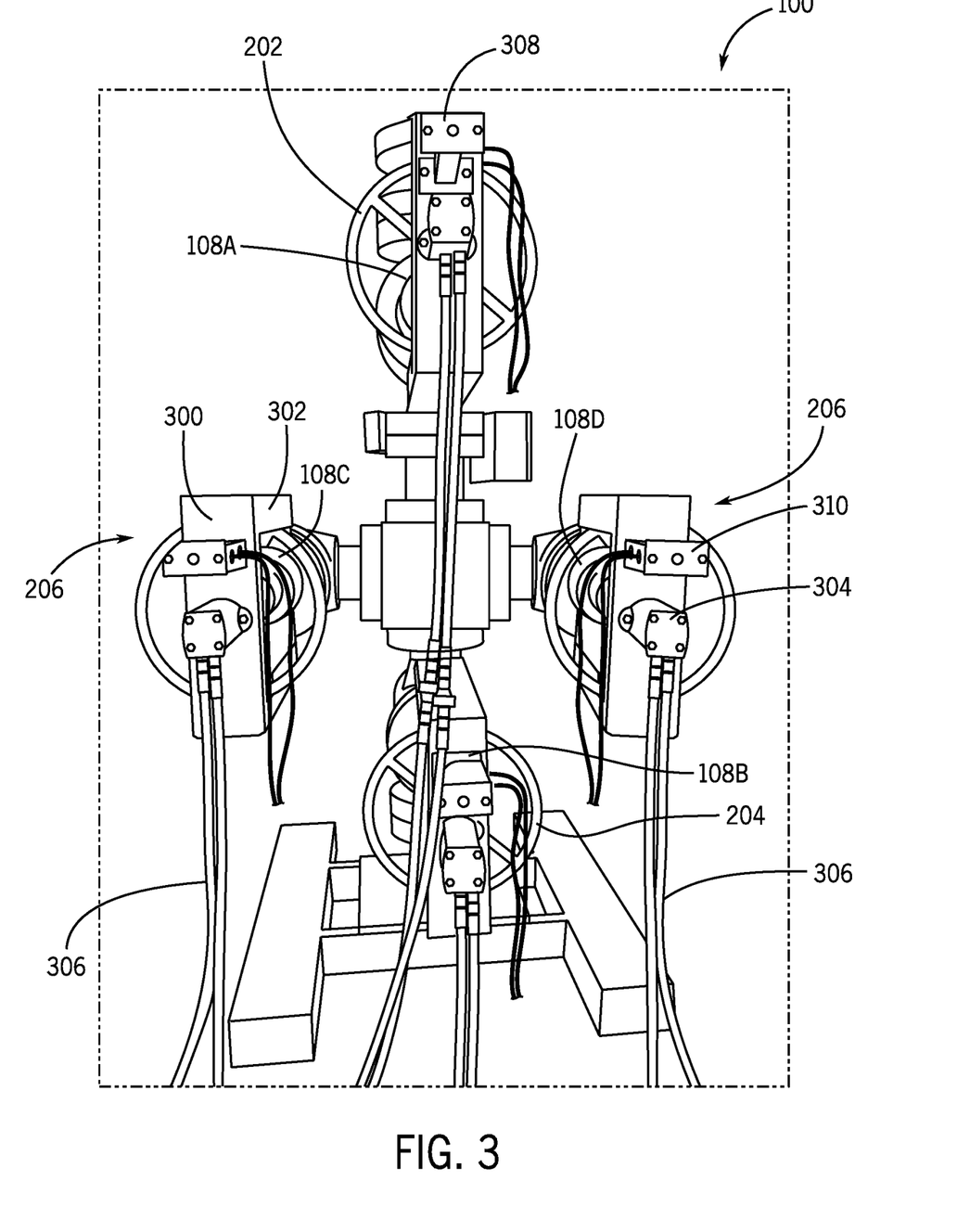
FIG. 3 is a perspective view of an embodiment of a wellhead with removable actuators, in accordance with embodiments of the present disclosure.

FIG. 3 is an isometric view of an embodiment of the wellhead 100 illustrating a number of different valves 108, each having a separate removable actuator 114 that may be utilized to selectively convert the valves 108 from manual operating valves to remotely operable valves. It should be appreciated that the configuration of the wellhead 100 is for illustrative purposes only and includes the valves 108A and 108B being axially aligned and the valves 108C and 108D being offset from a main flow path. Additionally, it should be appreciated that while the illustrated embodiment provides sufficient vertical distance to align (e.g., circumferentially align) the respective operators 202, 204 of the valves 108A, 108B, that other embodiments, such as the configuration in FIG. 2, may not have sufficient space for such an arrangement and may include the rotated or offset configuration of FIG. 2.

As described above, in various embodiments, wellhead 100 may include the valves 108, among other components not pictured for clarity with the present discussion, that regulate flow of fluid into and out of the wellbore. For example, certain valves may be moved between closed positions and open positions in order to direct fluids through the wellbore. In various embodiments, the valves may be operational via manual controls, such as hand wheels represented by the operators 202, 204. These control systems, however, may be undesirable when the wellbore 100 is exposed to high pressures and also due to their location below grade within the cellar 106. Additionally, including various meters and sensors at the wellhead 100 face similar problems because operators may have difficulty reading the sensors without getting close, which as noted above, is undesirable in high pressure applications and/or confined entries.

Embodiments of the present disclosure include the removable actuators 114 to act as conversion assemblies to convert manually operated valves 108 into remotely operated valves. Additionally, in various embodiments, the removable actuators 114 may further be utilized to convert actuated valves into valves actuated by a different mechanism (e.g., convert a pneumatic actuator into a hydraulic actuator). In certain embodiments, the removable actuators 114 include the frame components 206 for coupling to the valves 102. For example, the illustrated frame components 206 include a cross member 300 along with coupling members 302. The coupling members 302 are joined by the cross member 300 and may be utilized to secure the removable actuators 114 to the valves 108, such as to a bonnet of the valve, the valve body, or the like. The illustrated removable actuators 114 further include an actuator element 304, which may be a remotely actuatable element, such as a hydraulic actuator, a pneumatic actuator, an electrical actuator, or the like. The actuator element 304 may couple to a valve stem or a manual operator, which may then drive movement of the valve stem between an open position and a closed position. In this manner, the conversion assembly may be used in order to adjust operation of the valves 108.

In various embodiments, one or more flow lines 306 are utilized to provide motive power to the illustrated actuator elements 304. For example, the flow line 306 may enable hydraulic fluid to enter and exit a chamber of the actuator element 304, thereby driving movement of the valve stem to adjust a position of the valve. It should be appreciated that the flow lines 306 are for illustrative purposes only and that other systems and methods may be incorporated to provide motive power to the actuator elements 304. Furthermore, the relative location of the flow line 306 is also for illustrative purposes.

One or more sensors may be incorporated into the removable actuators 114 in order to facilitate operation of the monitoring system, as described above and later herein. The sensors may obtain the same or different information for each valve 108 and/or for the wellhead 100. For example, a first sensor 308 may correspond to a pressure sensor that receives a signal indicative of a pressure within the wellbore, within the wellhead 100, or another location associated with the wellhead 100. For example, the pressure sensor may be a pressure transducer that is exposed to a pressure within the wellbore 100 that indicates whether the valves 108A, 108B are shut.

Further illustrated in FIG. 1 is a second sensor 310, which may correspond to a position sensor for the removable actuators 114, and therefore for the valves 108. For example, the second sensor 310 may monitor a position of the valve stem, which may be correlated to a closed position for the valve, an open position for the valve, or any number of intermediate positions for the valve.

It should be appreciated that various other sensors and monitors may also be included within the wellhead 100, and that the illustrated pressure and position sensors are for illustrative purposes only. In embodiments, flow sensors may also be incorporated into the system, pressure sensors may be associated with the motive power source for the removable actuators 114, and the like. As will be described below, one or more of the sensors may receive and transmit information to a control system, which may provide information to operators to enable control of the valves 108 without having a person physically enter the cellar 106.

Figure 4:
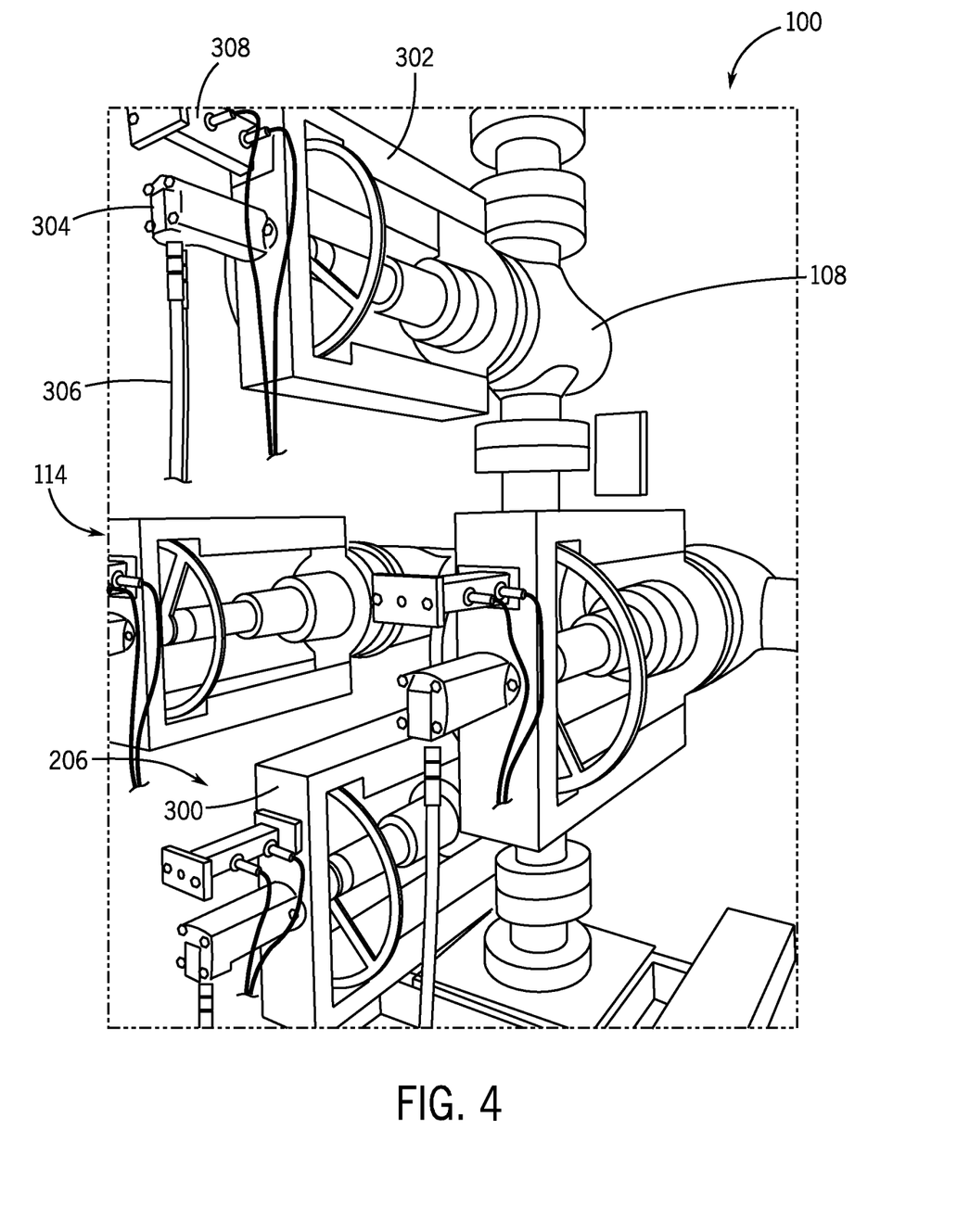
FIG. 4 is a perspective view of an embodiment of a wellhead with removable actuators, in accordance with embodiments of the present disclosure.

FIG. 4 is a perspective view of the wellhead 100 having the configuration shown in FIG. 3. In the illustrated embodiment, the valves 108 are manually controlled valves that include the operators 204, 204 illustrated as hand wheels for driving movement of the valve stem. In the illustrated embodiment, the frame components 206 couple to the valve via a bonnet such that the actuator element 304 engages the valve stem and/or the hand wheel. In various embodiments, at least a portion of the stem may extend through the hand wheel, enabling direct engagement to the stem. However, in other embodiments, direct engagement with the hand wheel may be preferred. In operation, motive power (e.g., fluid, electrical controls, etc.) is applied to the hand wheel and/or the valve stem to control operation of the valves 108 while the sensors 308, 310 may be utilized to provide information to remote operations personnel, thereby enabling operation of the system without having an operator in a confined space (e.g., the cellar 106) and while allowing operators to stay outside of a line of sight of the valves 108.

Figure 5:
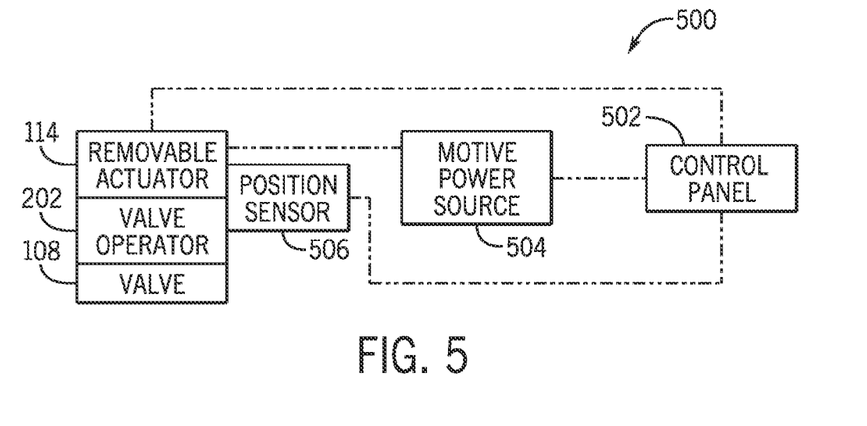
FIG. 5 is a schematic diagram of an embodiment of a control system, in accordance with embodiments of the present disclosure.

FIG. 5 is a schematic diagram of an embodiment of a control system 500 that may be utilized with embodiments of the present disclosure. As described, in various embodiments the removable actuator 114 may be coupled to the valve 108, such as to the valve operator 202, and controlled remotely by a control panel 502. Inclusion of the removable actuator 114 does not prevent operation of the valve in manual mode (e.g., by a hand wheel) and the removable actuator 114 may further be disengaged prior to manual operations. The illustrated embodiment includes the valve 108 and valve operator 202 having the removable actuator 114 coupled to the valve operator 202, but it should be appreciated that the removable actuator 114 may couple directly to the stem of the valve and bypass the operator 202. Further illustrated is a position sensor coupled to the valve, valve operator, and/or the removable actuator. As noted above, the removable actuator may provide information regarding a position of the valve during operations.

The illustrated embodiment further includes a motive power source 504, which may be utilized to drive operation of the removable actuator. Non-limiting examples of motive power sources include a hydraulic fluid source, a pneumatic fluid source, an electrical power source, and the like. Additionally, it should be appreciated that multiple different motive power sources may be incorporated and used with a single removable actuator. Moreover, different removable actuators may use different motive power sources. The illustrated control panel 502 may provide instructions (e.g., signal commands) to the motive power source to drive operation of the removable actuator 114 and/or the operator 202. Additionally, the control panel may send/receive signals from the removable actuator 114 and/or the position sensor 506, which may correspond to the sensors 308, 310. In this manner, operation of the valve is enabled from a distance where the valve is not within the line of sight of the operator. Moreover, operation is enabled where an operator is not positioned in a confined space, such as the cellar 106. Furthermore, operations include providing the removable actuator, which may be attached and detached from the valve.

Figure 6:
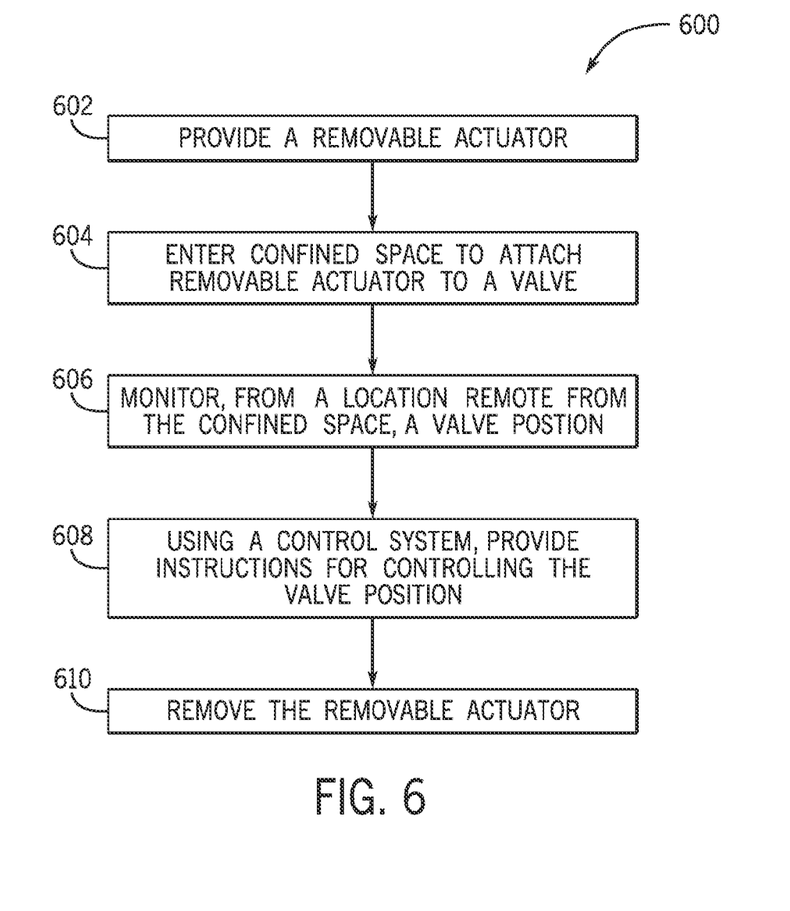
FIG. 6 is a flow chart of an embodiment of a method for controlling a valve, in accordance with embodiments of the present disclosure.

FIG. 6 is a flow chart of an embodiment of a method 600 for remotely controlling a valve using a removable actuator. It should be appreciated that this method, and all methods described herein, may include more or fewer steps. Additionally, the steps may be performed in a different order, or in parallel, unless otherwise specifically stated. This example begins with providing a removable actuator 602. The removable actuator may include a conversion assembly, as described above, that may couple to valve that already includes an actuation mechanism, such as a hand wheel driven manual operator or the like. The removable actuator may be attached to a valve that is located within a confined space 604. For example, the confined space may include a cellar associated with a wellhead. Data related to the removable actuator and/or associated valve, such as a valve position, may be monitored from a location remote from the confined space 606. The remote location may be outside of the confined space and may be outside of a pressure zone associated with a well. Additionally, the remote location may also be outside of a line of sight between an operator and the valve. In other words, the valve may not be directly visible from the remote location. A control system may be used to control the valve 608. For example, the control system may provide a signal to a pump to drive pressurized fluid toward the removable actuator, which may drive operation of the valve. The removable actuator may also be removed from the valve 610, for example after activities at the well site are completed. Accordingly, cheaper valves may be utilized for operation and then buried when the well is decommissioned, thereby reducing costs for operators while also providing improved working conditions for operators.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

What is claimed is:

1. A wellhead valve control system, comprising:
a removable actuator adapted to couple to a valve, the valve being operable via a first operational mode;
an actuator element associated with the removable actuator, the actuator element operable to modify the first operational mode of the valve to a second operational mode, the second operational mode being different from the first operational mode; and
a control panel, positioned remotely from the valve, the control panel configured to control the actuator element to adjust a valve position in the second operational mode.

2. The wellhead valve control system of claim 1, further comprising:
a sensor associated with the actuator element, the sensor configured to provide position information for the valve, the position information indicating whether the valve is in an open position, a closed position, or at least one intermediate position.

3. The wellhead valve control system of claim 1, wherein the removable actuator is coupled to the valve in a cellar.

4. The wellhead valve control system of claim 3, wherein the cellar is a confined space and the confined space is arranged below a blowout preventer (BOP) stack coupled vertically above the valve.

5. The wellhead valve control system of claim 1, wherein the second operational mode is at least one of a pneumatic operational mode, a hydraulic operational mode, or an electric operational mode.

6. The wellhead valve control system of claim 5, wherein the valve is operable via the first operational mode after the removable actuator is coupled to the valve.

7. The wellhead valve control system of claim 1, wherein the first operational mode is a manual operational mode and the second operational mode is a remotely actuatable operational mode.

8. A wellhead valve control system, comprising:
a removable actuator adapted to couple to a valve, the valve being operable via a first operational mode;
an actuator element associated with the removable actuator, the actuator element operable to modify the first operational mode of the valve to a second operational mode, the second operational mode being different from the first operational mode; and
a control panel, positioned remotely from the valve, the control panel configured to control the actuator element to adjust a valve position in the second operational mode;
a sensor associated with the actuator element, the sensor configured to provide position information for the valve, the position information indicating whether the valve is in an open position, a closed position, or at least one intermediate position; and
wherein a valve operator for the first operational mode is a hand wheel and the sensor is configured to measure a number of hand wheel turns, the number of hand wheel turns corresponding to an open position of the valve and a closed position of the valve.

9. A wellhead monitoring system, comprising:
a valve positioned along a flow path of the wellhead, the valve being a operable via a first operational mode that corresponds to a manual operating mode;
a removable actuator, coupled to the valve, the removable actuator enabling operation of the valve via a second operational mode, different from the first operational mode, the second operational mode being a remotely controlled operational mode; and
a control unit, arranged at a location remote from the wellhead and outside of a confined space associated with the valve, the control unit sending a signal to one or more motive power sources to drive operational of the valve via the second operational mode.

10. The wellhead monitoring system of claim 9, further comprising:
a sensor associated with the removable actuator, the sensor configured to provide position
information for the valve to the control unit.

11. The wellhead monitoring system of claim 9, wherein the confined space is a cellar positioned below grade.

12. The wellhead monitoring of claim 9, wherein the valve is coupled to a wellhead, the wellhead being vertically below a blowout preventer (BOP) stack.

13. The wellhead monitoring system of claim 9, wherein the valve is operable via the first operational mode after the removable actuator is coupled to the valve to override operation via the second operational mode.

14. The wellhead monitoring system of claim 9, wherein the removable actuator is coupled to at least one of a valve stem, a valve body, or an operator associated with the first operational mode.

15. The wellhead monitoring system of claim 9, wherein the removable actuator is coupled to the valve via a valve frame.

16. The wellhead monitoring system of claim 9, wherein the control unit is not in a line of sight with the valve or the removable actuator.

17. The wellhead of monitoring system of claim 9, wherein the removable actuator is removed from the valve after the wellhead is decommissioned.

18. A method for controlling a valve, comprising:
- receiving a removable actuator, the removable actuator changing an operational mode for a valve from a first operational mode to a second operational mode;
- entering a confined space, the valve being positioned within the confined space; coupling the removable actuator to the valve; and
- operating the valve via the second operational mode from a remote location.

19. The method of claim 18, wherein the remote location is not within a confined space and is outside of a line of sight of the valve and the removable actuator.

20. The method of claim 18, wherein the second operational mode is at least one of a pneumatic operational mode, a hydraulic operational mode, or an electric operational mode.

* * * * *